United States Patent [19]

Züllig

[11] 4,351,588
[45] Sep. 28, 1982

[54] PROCESS AND MEANS FOR CONTROLLING THE RADIANT ENERGIES OF THE ENTIRE SPECTRAL RANGE IN ROOMS

[75] Inventor: Harry T. Züllig, Montagnola, Switzerland

[73] Assignee: Relium AG, Rupperswil, Switzerland

[21] Appl. No.: 152,081

[22] Filed: May 21, 1980

[30] Foreign Application Priority Data

Apr. 24, 1979 [CH] Switzerland ......................... 3815/79
Jun. 21, 1979 [CH] Switzerland ......................... 5180/79

[51] Int. Cl.³ ...................... G02B 17/00; G02B 27/00
[52] U.S. Cl. .................................. 350/259; 126/439; 350/261; 350/264
[58] Field of Search ................................ 350/258–265; 126/428, 430, 439, 440

[56] References Cited

U.S. PATENT DOCUMENTS

| 721,258 | 2/1903 | Wadsworth | 350/259 |
| 2,006,648 | 7/1935 | Nobbs | 350/264 |
| 2,097,738 | 11/1937 | Oita | 350/264 |
| 2,665,610 | 1/1954 | Harrison | 350/260 |
| 4,198,953 | 4/1980 | Power | 350/258 X |
| 4,223,663 | 9/1980 | Carmichael et al. | 350/263 |

*Primary Examiner*—Richard A. Wintercorn
*Attorney, Agent, or Firm*—Heinrich W. Herzfeld

[57] ABSTRACT

Using windows with reflectors and roof elements with a triangular pyramidal structure, the natural sun rays of the entire spectral range from infra-red to ultra-violet are spread at least in a major part of the room in a controlled diffuse manner. Local excessive illumination and overheating of the room in the vicinity of the window are thereby prevented. In case of insufficient natural lighting, fluorescent lights permit a large-area, uniform overall room illumination. As regards rooms with flat roofs, additional light may be introduced in diffusely controlled manner into room by truncated pyramidal roof domes. The roof elements may comprise baffles by means of which acousting dampening openings can be adjusted individually for the purpose of additionally controlling the sound waves generated in the room. The invention allows creating conditions of optimal comfort in a room while simultaneously saving on auxiliary energy by using the natural energy of radiation in a controlled manner.

15 Claims, 15 Drawing Figures

PROCESS AND MEANS FOR CONTROLLING THE RADIANT ENERGIES OF THE ENTIRE SPECTRAL RANGE IN ROOMS

The present invention concerns on one hand a process for controlling the radiant energies in the entire spectral range, said energies irradiating for instance a room through a window or being generated in this room where they are to be spread as needed.

On the other hand, the present invention relates to means to implement this process, said means allowing to control as desired all the radiation energies.

In conventional construction and airconditioning technology, the attempt is made, by resorting to insulation techniques, to keep natural energies external to the room out of it, in particular thermal radiations, in order to achieve room conditions which are as constant as possible by mean of heating and cooling equipment. These insulating techniques in the vicinity of the windows essentially amount to the use of curtains, reflecting or absorbing glass, projecting roofs and awnings, where said elements ensure that also substantial amounts of the light present outside the window shall not reach the inside of the building at all and thereby must be replaced by electrical luminous bodies. It is further impossible in practice when using the known techniques to absorb the thermal radiation passing through the windows especially in the hot season except by energy-consuming airconditioning equipment. On ecological and ever increasing economic grounds, it is absolutely necessary to reduce to a minimum the auxiliary energy required for air-conditioning. Furthermore it is desirable to substantially improve conditions of discomfort frequently encountered in airconditioned rooms in order to increase both the well being and also the performance of the people in the room.

The pertinent starting point is that personal comfort in rooms is largely affected by the radiant energies of light, heat and sound, and that the control of these energies must be carried out as much as possible without resorting to auxiliary energy, particularly in the form of electricity.

It is therefore the object of the present invention to develop both a process and means so that by optimal control of all the radiant energies present in a room and at least in the entire spectral range, both comfortable conditions will be created in the room and the need to use auxiliary energy will be kept at a minimum.

It is furthermore the object of the invention to create the most advantageous possible conditions throughout the entire room, in particular regarding light, heat and sound, without using auxiliary energy.

Furthermore the process of the invention and the corresponding means shall be such as to be not only appropriately integrable in new construction by rendering airconditiong equipment widely superfluous, but also shall be suitable for retrofitting in old construction.

Furthermore the means of the invention shall be so designed that they can be employed without problems and will be able to adhere to the pertinent regulations and building standards.

Furthermore if at all possible, the gain in comfortable conditions regarding light, heat and sound should not be at the cost of drawbacks in other areas.

This problem is solved by the invention by a process for controlling, in the entire spectral range, radiant energy amounts irradiating a room having a plurality of confining walls comprising a bottom floor, a side wall zone and a ceiling zone, which room the energy amounts are to fill, said radiant energies stemming from radiation sources outside or inside said room, which process comprises spreading the radiant energy amounts to adopt a state ranging from diffusion to total reflection in the interior of the room to such a degree that all zones remote from the sources of radiation are supplied with diffuse radiation of substantially uniform intensity, whereby the occurrence of excessively irradiated zones in the room is avoided.

The aforesaid problem is further solved by an energy-spreading means for controlling, in the entire spectral range, radiant energy amounts irradiating a room having a plurality of confining walls comprising a bottom floor, a side wall zone and a ceiling zone, which room the energy amounts are to fill, said radiant energies stemming from radiation sources outside or inside said room, which means comprise surfaces adapted for predetermined spreading of radiant energy to attain a state ranging from diffusion to total reflection, in the entire spectral range, said means being mountable on a confining wall of the room.

The solution of the problem of the invention is based on the insight that each electromagnetic radiation, and therefore every light and heat radiation, furthermore also each directed acoustic beam, which also represents a radiation in the sense of the invention, can be controlled by reflection and that accordingly it must be possible to achieve a spreading of such radiation(s) in the room and in particular at the room ceiling, whereby radiation concentration can be averted in the area of the window. It will be feasible in this manner both to favorably affect the lighting conditions in the room by approaching an indeal state for the light intensity and by the absolute values of illumination being kept high over as long a period of the day as possible, and to actively make use of the major part of the irradiated heat, resorting to room boundary surfaces as large as possible such as ceilings, walls and floors, so that their heating per unit area shall be minimal and hence the heating of the air particles and thus of the room climate shall be negligibly small.

Obviously, the practical implementation of such insights within the scope of the process of the invention requires advantageously the combined and mutually adjusted application of several engineering means, however already the application of a single of these means in a room permits an improvement in the comfort in this room and a saving in energy.

The description below relates to the drawing and shows particulars of illustrative embodiments of the invention.

FIG. 4 shows three embodiments of such reflectors, (FIG. 4 in top view; FIG. 4A in cross section; FIGS. 4B and 4C details)

Figure 1:
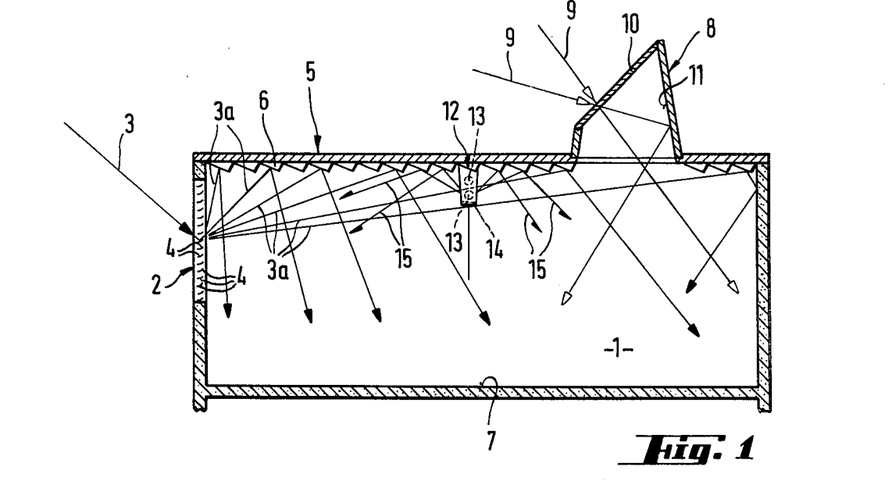
FIG. 1 schematically illustrates the process of the invention with a lengthwise section through a room.
Figure 3:
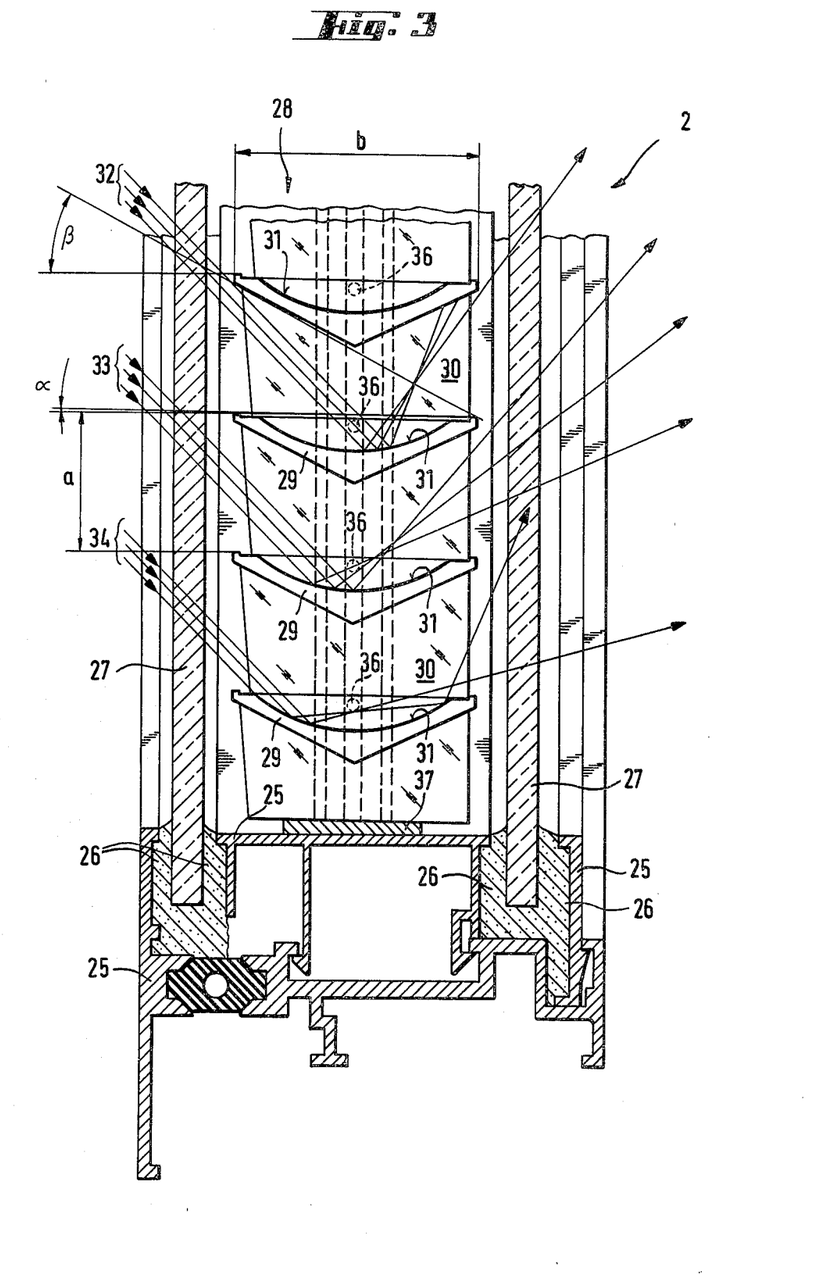
FIG. 3 is a cross-section of a window into which are integrated reflectors of the invention.
Figure 4:
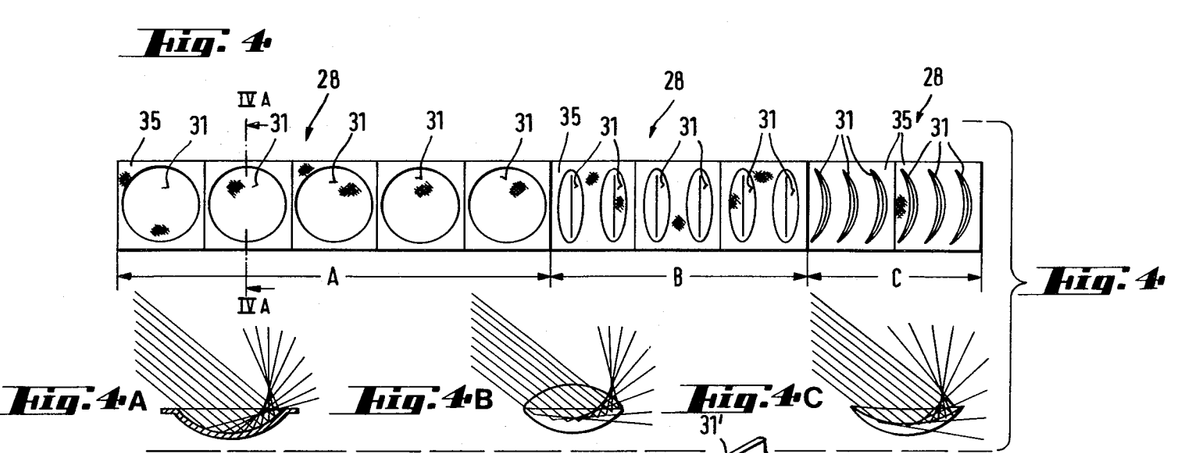
Figure 5:
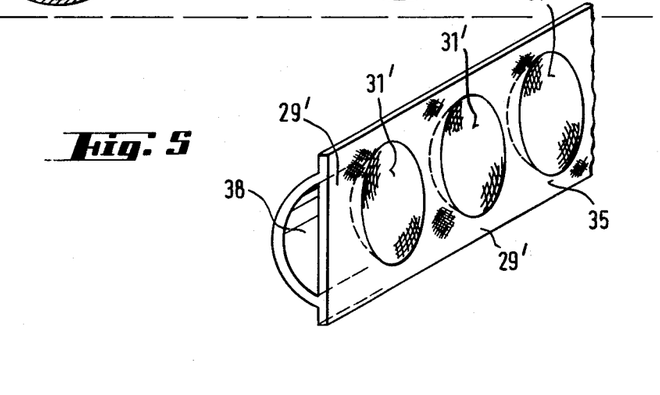
FIG. 5 is a perspective of a further embodiment of such reflectors.

By and large, both the process of the invention and the means of the invention for implementing the process can be explained in principle using FIG. 1. Each radiation in room 1 is controlled as widely as possible and in the entire spectral range, the essential matter being to diffusely reflect these radiations and to scatter them as uniformly as possible across the entire room 1. In the example shown, this is illustrated by means of the light rays present in room 1. Room 1 is shown in cross-section and on one hand receives solar radiation 3 through a window 2. This radiation, as explained further below in relation to FIG. 3 through 5, is deflected in the window 2 itself in controlled manner by reflectors 4, whereby the room ceiling 5 is diffusely irradiated. Direct irradiation of the solar rays 3 into the room 1 is widely prevented by reflectors 4.

The indirect diffuse solar radiation 3a from the reflectors 4 of window 2 is again deflected in controlled manner by the ceiling elements 6 described in detail in relation to FIG. 6 through 9, and in such manner that it irradiates the room floor 7. This floor is uniformly illuminated by diffuse sunlight. Places with excessive brightness do not arise.

The solar radiation 9 entering the room 1 through the truncated roof dome 8 is partly radiated through the sloping window 10 directly into the room 1, but it is also partly deflected from the dome wall 11 and reradiated indirectly into room 1.

Lamps or luminous bodies can furthermore be used in room 1 as sources of radiation. Their design and operation within the scope of the common basic idea of the invention, resp. the concept of the invention or system, will be described herein in relation to a fluorescent light 12, details of which being explained in relation to FIG. 12. The light generated by the fluorescent tubes 13 is spread in room 1 in diffuse manner as determined by the covering 14, a significant amount of luminous radiation being projected on the ceiling elements 6 from where it is diffusely reradiated onto a large room surface, as indicated by arrows 15. To exploit this effect as much as possible, it is essential that the light source, here the fluorescent tubes 13, be offset from the ceiling elements 6.

The drawing clearly shows that all radiations present in room 1 are controlled in purposeful manner by means of the elements of the invention in that room, namely the window 2 with reflectors 4, ceiling elements 6, truncated light dome 8 and light source 12, and that they are spread as optimally as possible in room 1, this spreading taking place advantageously in a wholly diffuse manner. Zones with excessive brightness can be averted, by applying the process of the invention and the means of the invention for implementing it, in room 1. At the same time, room 1 is provided with daylight in a substantially better manner, especially in its areas away from window 2, even when the truncated roof dome 8 is not used, than is the case in the absence of the invention.

Figure 2:
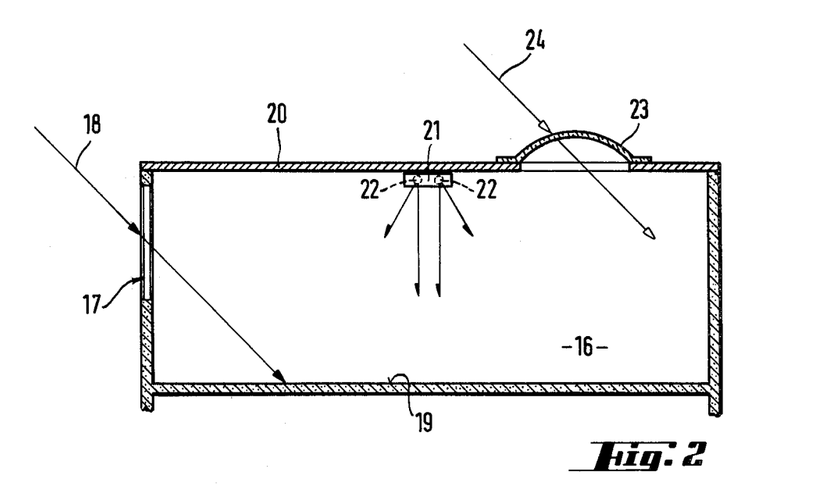
FIG. 2 illustrates the situation in a room where neither the process of the invention nor the corresponding means are employed.

This is at once obvious when considering FIG. 2, which shows a room 16 in cross-section and which lacks the means of the invention. The solar radiation 18 enters through the window 17 into the room 16 in a practically uninterrupted manner and projects the window aperture as an excessively bright spot on the room floor 19. As the room ceiling 20 is not specifically designed as a reflector means and as the conventional fluorescent lamp 21 is mounted with its fluorescent tubes 22 very close underneath the room ceiling 20, their light practically is radiated only directly on the region below them. Again the solar radiation 24 incident through the roof dome 23 is radiated directly and indirectly into room 1 where it brightens a specific area.

Such a situation results in the adequately known fact that a conventionally equipped room 16 comprises three regions which with respect to the remaining space of the room much differ in their brightness, and each of which is located in the direct area of irradiation of the described radiation sources: window 17, lamp 21 and dome 23. Uniform room illumination can be achieved with conventional means only by screening the excessively irradiating sunlight and suspending a number of light sources from the room ceiling.

As furthermore the radiations in the entire spectral range, from the thermal rays in the infra-red to the ultra-violet, and even sound waves exhibit similar or identical spreading characteristics as visible light, the above discussion also applies to the thermal radiation from the sun and entering room 1. This also applies to the sound generated in room 1, which, as shall later be shown in relation to FIG. 6 through 9, will be radiated back diffusely from the ceiling elements 6.

Therefore equipping a room with the means of the invention not only shall result in an improved spreading of the light, but also a decreased heating of individual room segments due to incident sun, and a reduction in the noise level in the room on account of the diffuse reradiation of the sound waves from the ceiling elements.

Therefore the invention permits a reduction in illuminating bodies at constant room brightness, a reduction in the required energy of cooling needed to stabilize the room temperature, and a reduction in the overal noise level in the room for constant local sound generation.

The advantages of the invention shall be discussed even more comprehensively below in relation to the description of individual illustrative embodiments of the various means of the invention for carrying out the process of the invention.

A cut-out can be noted in FIG. 3 as a possible design for a window of the invention. This window essentially consists of a conventional window frame 25 with double glazing, namely two glass panes 27 held in putty grooves 26 with reflector elements 28 mounted in-between. These always comprise a support element 29, a spacer 30, and the reflectors proper 31.

The light incident on reflectors 31 is deflected diffusely in controlled manner into the depth of the room, as illustrated by the beams 32,33 and 34 and three reflectors 31, each reflector 31 being impinged by the beams 32,33 and 34 shown in relation to three reflectors 31, whereby a very pronounced, controllable spreading of the intense incident light is obtained.

Advantageously the reflectors 31 are specular recesses embedded in rod-shaped support elements 29, the surfaces of these recesses comprising a multitude of diffusing structures. The recesses, or reflectors 31, may be in a variety of shapes, as indicated by FIG. 4, wherein in part A they are dome-shaped, almond-shaped in part B, and banana-shaped in part C. The surfaces 35 of the support elements 29 surrounding the reflectors 31 advantageously shall have the same structure as the surfaces of reflectors 31, and also are specular. Each reflector shape exhibits specific light deflecting characteristics, as indicated in the lower half of FIG. 4.

The support elements 29 are mounted one above the other in the window between the glass panes 27 and rest on the spacers 30, that is they are connected to them, these spacers advantageously consisting of fully transparent, light-fast material. On both sides at the ends of the support elements 29 advantageously extending transversely through the entire window, they are connected by fastening means 36 to glide rails 37 joined to a frame passing around the inside of the window frame 25.

The vertical distance a between the support elements 29, or the rows of reflectors, and the angle of incline $\alpha$ of the axis of the reflectors 31 with respect to the horizontal are selected as a function of the latitude-determined mean position of the sun and the desired effective control, i.e. the portion of the total collimated solar radiation incident on the window which is to be converted into diffuse radiation. Furthermore, the optimal width b of the support elements 29 is to be determined as a function of the maximum admissible blocking angle $\beta$ which, together with the distance a determines how much visual contact a person inside the room may have with the world outside.

It was found in practice that the following values lead to good results for central European conditions:

$a=25$ mm; $b=38$ mm; $\alpha=6°$; $\beta=27°$.

The expert will notice that the described window controls the light, or the total radiation, not only in the vertical plane, but also horizontally, the apparent motion of the sun however being partly corrected in such manner that a partial deflection takes place in the direction opposite to the motion of the sun. This correction of the irradiation therefore takes place in the third dimension. Also, an automatic quantitative control takes place, as for increasing elevation of the sun, there takes place a reduction of the irradiated surface of reflection in a reciprocal manner, and thereby a quantitative decrease of the incoming irradiation. The effectiveness of deflection is inversely proportional to the angular solar elevation. Even for an overcast, cloudy sky, there will be an improvement of the conditions within the room. This obtains especially by combining the window of the invention with the ceiling elements of the invention per FIG. 6 through 9.

FIG. 5 schematically shows another embodiment of a support element 29' with reflectors 31', said support element 29' being designed below the reflectors 31' as a hollow body in the shape of a channel 38 and acting as an absorber for part of the thermal irradiation. The accumulated heat in this embodiment can be transferred by a liquid or gaseous medium, for instance air and be used for other purposes, for instance cooling.

Figure 6:
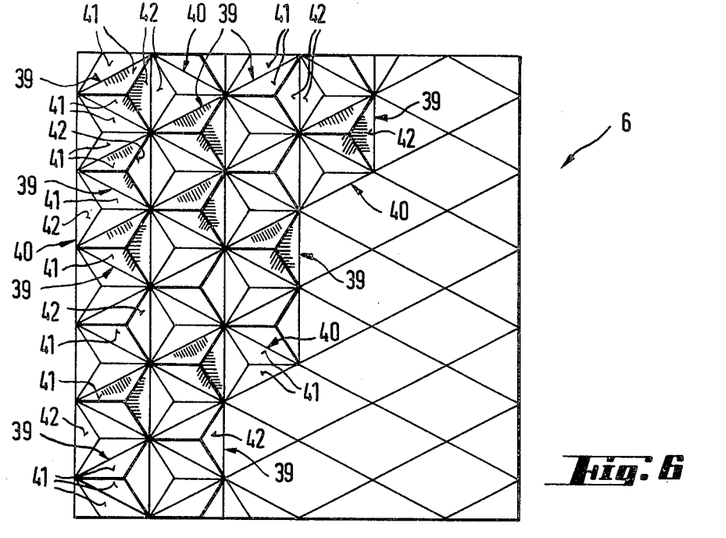
FIG. 6 is a perspective of a first embodiment of a ceiling plate.

As indicated by the description relating to FIG. 1, an optimal result when using the window of the invention will be obtained only in conjunction with the ceiling elements of the invention. Such a ceiling element 6 is shown in FIG. 6 as seen from below. It comprises a surface with a triangular pyramidal structure, with raised and lowered triangular prismatic structures 39 and 40 resp. arranged in such rows that raised and lowered prisms 39 and 40 alternate on each side and again alternatingly in each direction. Each triangular pyramid 39 and 40 comprises two lateral triangular faces 41 and a rear triangular face 42. The ceiling element 6 must be mounted in such manner in the room that the lateral triangular faces 41 in the raised triangular pyramids 39 point in the direction of the window, while the rear triangular surfaces 42 of the raised pyramids 39 point into the room. Advantageously the raised and lowered triangular pyramids 39 and 40 are identical. The edges where the various triangular faces 41 and 42 meet should be as sharp as possible.

The dimensions of the triangular pyramids 39 and 40 should be so selected as a function of the room conditions as to obtain optimal spreading or scattering of the light falling on the ceiling elements 6, whether this be achieved only by means of the reflectors 31 of the window 2 or by luminous means 21. Furthermore a careful selection of the dimensions of the triangular pyramids 39 and 40 of the ceiling elements can provide a desired diffusion of sound waves in such a manner that even though there are strong noise sources in the room, a psychologically tolerable acoustic level will obtain in the room.

It was found in practice that standard ceiling elements 6 which are $62.5 \times 62.5$ cm in size and each comprising 36 full and half triangular pyramids 39 and 40 are very appropriate. The triangular pyramids 39 and 40 advantageously will have the following dimensions: altitude from base to tip$=2.8$ cm; width$=10.4$ cm and length$=10.4$ cm. Such ceiling elements may be properly formed from plastic, plaster or sheet metal and advantageously will have a rough surface.

Figure 7:
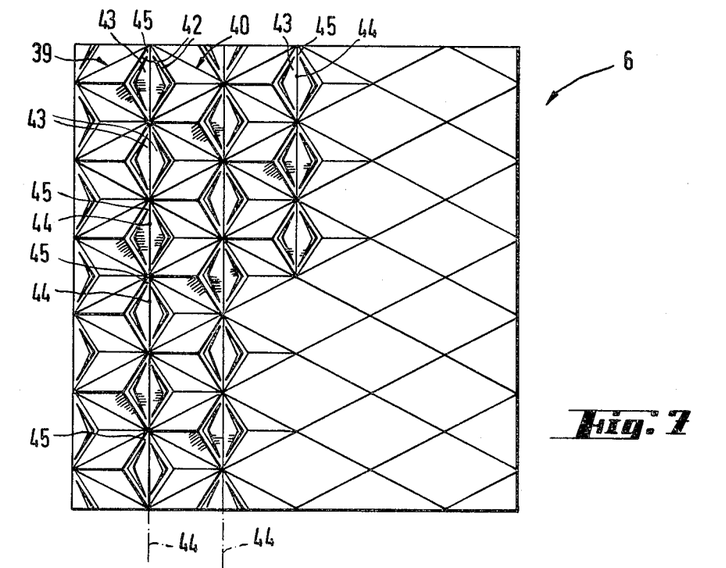
FIG. 7 is a perspective of a second embodiment of a ceiling plate.
Figure 8:
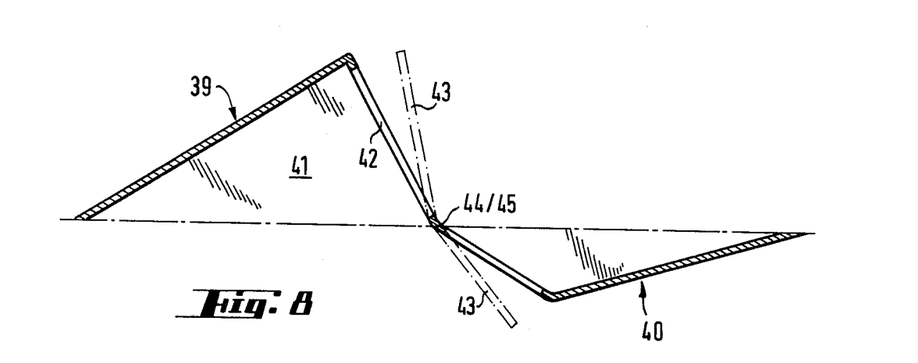
FIG. 8 shows a cross section through part of such a ceiling plate.
Figure 9:
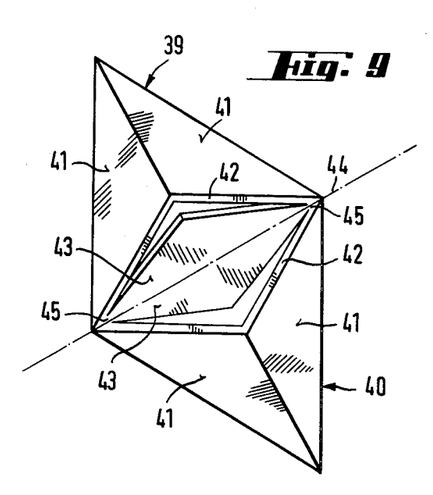
FIG. 9 is a projection of a prism single combination in a ceiling plate.

Ceiling elements made of sheet metal advantageously are provided at the rear triangular faces 42 of the triangular pyramids 39 and 40 with pivoting triangular baffles 43, as shown in FIG. 7, 8 and 9, which are made by stamping and which can rotate about the uncut connections 45 remaining as axis of rotation 44 in such a manner that the ceiling element surface can be provided with openings amounting up to 24% of the total surface, without however the total surface required for diffusion thereby being reduced.

In this manner the acoustic damping efficiency of the ceiling element of FIG. 6 may again be substantially increased and especially it can be adjusted subsequently to the installation of the ceiling in a room and even be adapted to local noise conditions, something which was previously impossible with conventional acoustic damping ceiling plates. Furthermore the openings obtained by pivoting the baffles 43 permit optimal ventilation and venting.

On the basis of the above discussion, it is clear to the expert that the ceiling element of the invention assumes a very significant function in solving the problem basic to the invention. This applies not only to optimal illumination of the room by the reflection of the light incident on it and to acoustic damping, but also especially to stabilizing the room temperature even in the presence of intense sunshine, as the thermal radiation, similar to the luminous one, is reflected by the reflectors 31 of the window onto a relatively large surface, i.g. projected on it, said surface consisting of ceiling elements and by its structure comprising an additional area, and easily able to absorb and transfer even large amounts of heat passing through the window into the room. Thereby sunshine-determined heating of the room is extensively averted and the use of airconditioning and cooling equipment in offices, manufacturing spaces and residential rooms made superfluous, without paying the price of screening the window against the sun and hence darkening the room.

Figure 10:
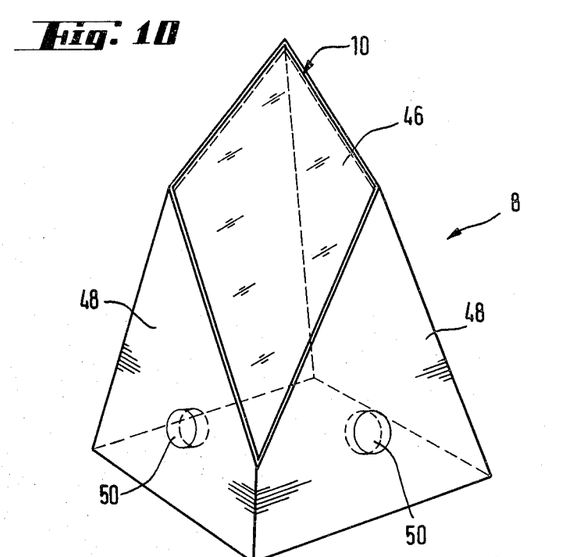
FIG. 10 is a perspective of a first embodiment of a truncated light dome as a further means of the invention.
Figure 11:
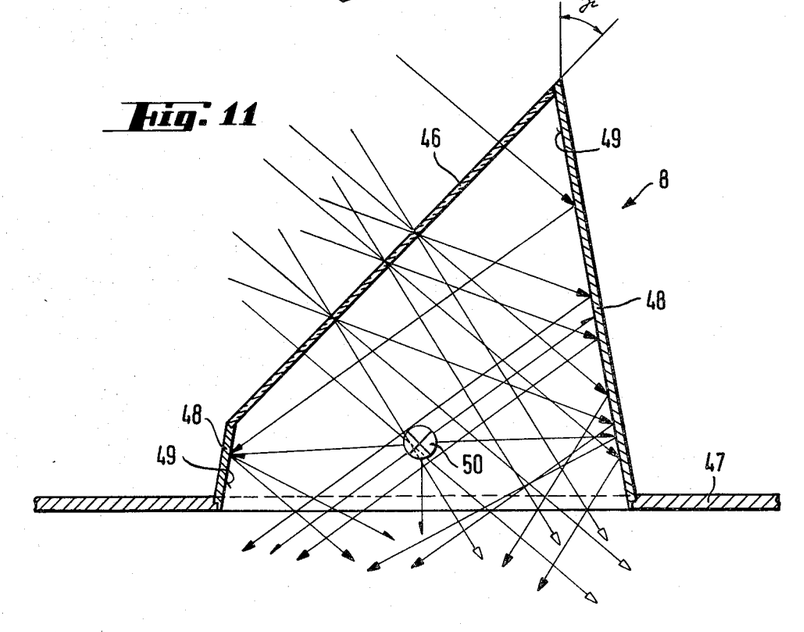
FIG. 11 is a cross-section of a second embodiment of a truncated light dome combined with two artificial light sources.
Figure 12:
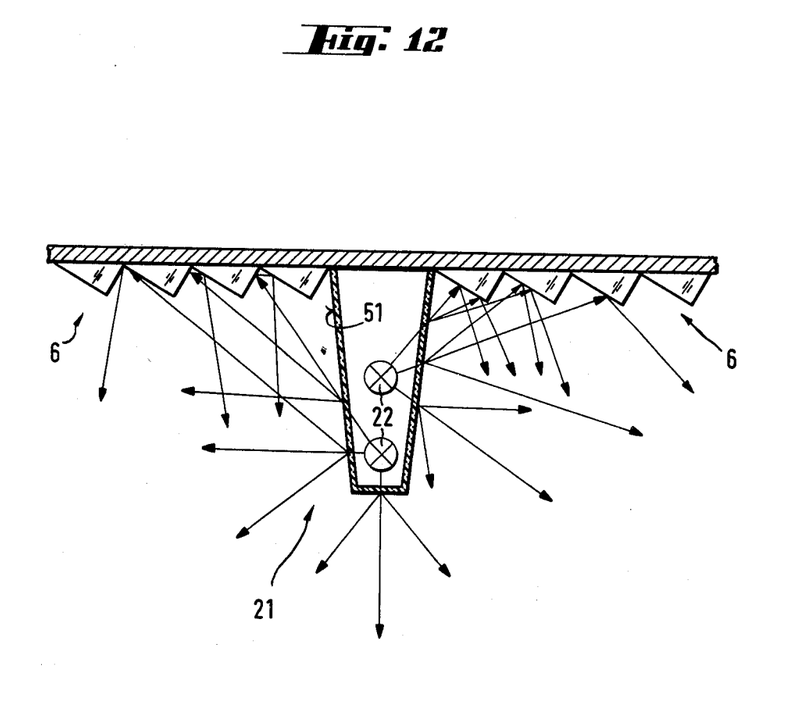
FIG. 12 is a cross section of a light source representing a further means of the invention.

As regards the topmost rooms in flat-roof buildings, especially in single-story manufacturing and sales rooms with flat-roofs, where ordinarily adequate room lighting without artificial light sources is impossible on account of the large built-up floor space, the truncated roof dome 8 forming the object of the invention as shown in FIGS. 10 and 11, advantageously in combination with the window of the invention and the ceiling element of the invention and possibly also together with the fluorescent light described in relation to FIG. 12 provides the possibility of ensuring enough illumination by daylight in the entire room.

FIG. 11 schematically shows the beam of light incident on glass pane 46 within the dome 8. This figure simultaneously also illustrates the beam path from two light sources 50 of FIG. 10 mounted inside the truncated roof dome 8. The expert easily will see that this truncated roof dome 8, contrary to the case for conventional roof domes and shed roofs, already deflects light incidnet at a very shallow angle into the room, as such light is reflected into the room from the wall inner faces 49.

This roof dome 8 is in the shape of a truncated pyramid with obliquely cut-off tip, and advantageously is covered by a glass pane 46. To be optimally effective, such a dome is advantageously arranged in sets, its glass pane 46 being mounted at easterly, southerly and westerly orientations. Similarly to the surfaces of the ceiling elements 6, inner faces 49 of dome wall 48 must be mat-white and preferably slightly roughened to provide good properties of reflection and diffusion. The roof is indicated by 47.

The angle of incline of the glass pane is independent of the geographic latitude where the dome is to be used, because the lesser this angle, the more light at shallow incidence will be captured. As regards central European conditions, an incline of 45° for a mean sun elevation of 30° was found optimal. A square 1.2 to 1.8 m on the side is very well suited as the base surface of the pyramidal frustrum.

FIG. 12 shows a further significant means for solving the problem basic to the present invention. This is an artificial light source in the form of a fluorescent lamp 21 mounted below or between the ceiling elements 6 and permitting a substantially improved and more effective illumination of the room with respect to conventional installations. The known fluorescent lamps are so designed that the light they generate is radiated predominantly or exclusively downwards and sideways, so that essentially that part of the room directly underneath the lamp will be brightened. Especially were double-tube lamps are involved, a zone is often created in the room which suffers from excessive point illumination. To avert excessive differences in brightness, a plurality of fluorescent lamps are hung in one room on one hand, and on the other these lamps are covered with strongly light-absorbing plastic grids. Accordingly the average room brightness is not rationally related to the energy required and to the effective illuminating efficiency of the fluorescent tubes.

This drawback is eliminated by the fluorescent lamp 21 of the invention in connection with the ceiling elements 6 of the invention, which requires substantially less energy and provides an appreciably improved illumination in a comparable room. The fluorescent lamp 21 of the invention contrary to the conventional fluorescent lamp comprises advantageously fluorescent tubes 22 mounted one below the other which are as much below the ceiling elements 6 as possible. These fluorescent tubes 22 are surrounded by a light-diffusing housing 51, for instance made of synthetic frosted glass, in such a manner that the collimated light rays from the fluorescent tubes 22 are diffusely reradiated into the room. Because the fluorescent tubes 22 are at some distance from the ceiling elements 6, these elements receive light radiation over a relatively large area and in turn diffusely reflect the light generated by the fluorescent tubes 22 into a large part of the room. This prevents excessively illuminating a small room segment, on the contrary a room illumination generally pleasant to the eye is achieved. Fewer, about 20% fewer fluorescent lamp 21 are required to illuminate thoroughly a defined room at a predetermined lux level than for conventional neon lamps and ceiling elements. Thus a substantial saving in electric power is possible.

It was found in practice that with 40-watt fluorescent tubes 22, with the upper one about 15 cm and the lower one about 25 cm from the ceiling elements 6, very good results are obtained.

The expert will easily see from the above description that all the means of the invention, that is, the window 2, the ceiling elements 6, the fluorescent lamp 21 and the roof dome 8 are based on one common concept of the invention and that, for an optimal solution to the problem which is the basis of the invention, they must all be used jointly, the truncated roof dome 8 being mostly applicable only when a room is located uppermost in a building and is covered by a flat roof. While each of the means of the invention when used without the others will offer advantages with respect to conventional means of similar functions, it is inappropriate to some extent to make use of the window and the light source without the ceiling elements, and vice-versa.

The expert will further understand that the process of the invention for the first time makes it possible to control all natural energies of radiation within the spectral range in a room for the purpose of generating optimal comfort in the room, without screening them partly from the room or eliminate them and creating in return comparable conditions by radiations from auxiliary and additional energy. It is clear therefore at once that the invention serves not merely to create the most optimal possible conditions of comfort, but additionally allows saving very substantial amounts of auxiliary energy by rendering superfluous for instance airconditioning equipment, without loss in comfort.

Obviously the dimensions and values indicated in the above description for the particular means of the invention are solely illustrative in nature and that the invention is not restricted to the shown embodiments of these means. On the basis of the information disclosed in the specification, the expert is at once in a position to design the described means in another manner and to adapt them optimally to specific conditions, without thereby inventive activity being required of him.

I claim:

1. An energy-spreading installation for controlling, in the entire spectral range, radiant energy amounts irradiating a room having a plurality of confining walls comprising a bottom floor, a side wall zone and a ceiling zone, which room the energy amounts are to fill, said radiant energies stemming from at least one radiation source located outside or inside said room, comprising surface means adapted for a predetermined spreading, in said room, of radiant energy in order to attain a state ranging from diffusion to total reflection, in the entire spectral range, said means being mountable on a confining wall of the room; wherein said surface means comprise those of a double-glazed window, said window comprising a plurality of reflection elements arranged one above the other and located between the two glass panes of the window; and wherein said reflection elements comprise shell-shaped reflectors and support elements for said reflection, said support elements being specular on one side; and said support elements being of transparent plastics material and their side holding the reflectors comprising a specular surface with diffusing structures.

2. An energy-spreading installation for controlling, in the entire spectral range, radiant energy amounts irradiating a room having a plurality of confining walls comprising a bottom floor, a side wall zone and a ceiling zone, which room the energy amounts are to fill, said radiant energies stemming from at least one radiation source located outside or inside said room, comprising surface means adapted for a predetermined spreading, in said room, of radiant energy in order to attain a state ranging from diffusion to total reflection, in the entire spectral range, said means being mountable on a confining wall of the room; wherein said surface means comprise those of a double-glazed window, said window comprising a plurality of reflection elements arranged one above the other and located between the two glass planes of the window; and wherein said reflection elements comprise shell-shaped reflectors and support elements for said reflectors, said support elements being specular on one side; and wherein said support elements are provided with an internal duct and are designed as combined reflecting and absorbing elements and are adapted for being cooled by a coolant flowing through said duct.

3. An energy-spreading installation for controlling, in the entire spectral range, radiant energy amounts irradiating a room having a plurality of confining walls comprising a bottom floor, a side wall zone and a ceiling zone, which room the energy amounts are to fill, said radiant energies stemming from at least one radiation source, said installation comprising surface means adapted for a predetermined spreading, in said room, of radiant energy in order to attain a state ranging from diffusion to total reflection, in the entire spectral range,
said surface means comprising, at least one ceiling element, adapted to be installed in said ceiling zone, which ceiling element has a surface structure in the form of pyramids having triangular bases and arranged in at least one row, each pyramid base having at least two of its edges in common with two adjacent pyramids, and in each pair of said pyramids, a first pyramid projecting downwardly with its apex pointing toward the interior of said room and the other pyramid being raised with its apex pointing away from said room to the outside above said ceiling.

4. The energy-spreading installation of claim 3, wherein said surface means comprise those of a double-glazed window, said window comprising a plurality of reflection elements arranged in several rows mounted one above the other and located in a middle zone between the two glass panes of the window.

5. The energy-spreading installation of claim 4, wherein said reflection elements comprise shell-shaped reflectors and support elements for said reflection, said support elements being specular on a concave side thereof facing upwardly.

6. The energy-spreading installation of claim 5, wherein said support elements are of metal and the reflectors are stamped into them.

7. The energy-spreading installation of claim 3, wherein said ceiling element comprises several rows of said adjacent triangular pyramids in an arrangement wherein the particular rear triangular faces of the raised pyramids join the rear triangular faces of the pyramids.

8. The energy-spreading installation of claim 7, wherein said triangular pyramids have two identical triangular side faces symmetrically joined to the rearward triangular faces.

9. The energy-spreading installation of claim 7 or 8, wherein said ceiling elements are made of plaster of Paris.

10. The energy-spreading installation of claims 7 or 8, wherein said ceiling elements are made of sheet metal.

11. The energy-spreading installation of claim 7 or 8, wherein said ceiling elements are made of sheet metal and further comprise baffles stamped from the rear triangular faces and baffle connecting means for connecting adjacent ones of said baffles in an axis of rotation both with one another and to the triangular faces, said baffles being pivotable about said axis of rotation for the purpose of achieving individually adjustable openings.

12. The energy-spreading installation of claim 3, wherein said surface means comprise those of a double-glazed window, said window comprising a plurality of reflection elements arranged one above the other and located in a middle zone between the two glass panes of the window, said reflection elements comprising shell-shaped reflectors and support elements for said reflection, said support elements being specular on a side thereof facing upwardly, and being designed as combined reflecting and absorbing elements, each of said support elements being provided with an internal duct and adapted for being cooled by a coolant flowing through said duct.

13. The energy-spreading installation of claim 12, wherein said reflectors are recesses in one of said surfaces of said double-glazed window.

14. The energy-spreading installation of claim 13, wherein said recesses are shaped as cupolas.

15. The energy-spreading installation of claim 3, wherein said surface means comprise surfaces of a roof dome in the shape of a truncated pyramid having an at least approximately square base and being a frustum resulting from an obliquely cut-off tip such that the inclined top face of the frustum is rhombic with one corner of the rhomb at the highest and the opposite corner at the lowest point of the cut-off face.

* * * * *